(12) United States Patent
Bitter et al.

(10) Patent No.: US 12,647,417 B1
(45) Date of Patent: ***Jun. 2, 2026

(54) SYSTEMS AND METHODS FOR SECURE DATA TRANSFER

(71) Applicant: United Services Automobile Association (USAA), San Antonio, TX (US)

(72) Inventors: Dustin Bowen Bitter, Lehi, UT (US); Marta Leigh Argumedo, Helotes, TX (US); David Joaquin Harris, San Antonio, TX (US); Thomas Wayne Schwarz, Jr., Helotes, TX (US); Gabriel C. Fernandez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,265

(22) Filed: May 20, 2024

Related U.S. Application Data

(63) Continuation of application No. 18/363,523, filed on Aug. 1, 2023, which is a continuation of application (Continued)

(51) Int. Cl.
*G06F 7/04* (2006.01)
*H04L 9/40* (2022.01)

(52) U.S. Cl.
CPC ........ *H04L 63/0876* (2013.01); *H04L 63/083* (2013.01); *H04L 63/107* (2013.01)

(58) Field of Classification Search
CPC . H04L 63/0876; H04L 63/083; H04L 63/107; H04L 63/04; G06F 21/31;
(Continued)

(56) References Cited

U.S. PATENT DOCUMENTS

| | | |
|---|---|---|
| 7,581,113 B2 | 8/2009 | Smith et al. |
| 11,765,166 B1 | 9/2023 | Bitter |

(Continued)

OTHER PUBLICATIONS

Zhang et al, Personalized Content Delivery to Mobile Devices, Oct. 8, 2003, IEEE, pp. 2533-2538. (Year: 2003).*

(Continued)

*Primary Examiner* — Philip J Chea
*Assistant Examiner* — Jenise E Jackson
(74) *Attorney, Agent, or Firm* — Fish & Richardson P.C.

(57) ABSTRACT

A computer-implemented method for data segmentation to improve security is described. The method includes receiving a request, from a client device of a user, for authentication information; parsing the request; based on the parsing, determining an authentication score that represents a likelihood that the request is from an authenticated device; determining, from the authentication score, a number of segments into which the requested authentication information is divided; and for each of the segments, assigning one or more portions of the authentication information to that segment, in which each segment is associated with one or more times at which to transmit information assigned to that segment, and at one or more times specified by that segment, transmitting one or more portions of the authentication information assigned to that segment to the client device.

21 Claims, 7 Drawing Sheets

Related U.S. Application Data

No. 17/329,380, filed on May 25, 2021, now Pat. No. 11,765,166.

(58) Field of Classification Search
CPC .......... G06F 21/42; G06F 21/43; G06F 21/44; G06F 21/45; G06F 21/60; G06F 21/604; G06F 21/606; G06F 21/6245; H04W 12/06; H04W 12/63

See application file for complete search history.

(56) References Cited

U.S. PATENT DOCUMENTS

| | | | |
|---|---|---|---|
| 12,028,340 B1 | 7/2024 | Bitter | |
| 2006/0156385 A1* | 7/2006 | Chiviendacz | H04L 9/3271 |
| | | | 726/2 |
| 2008/0195550 A1 | 8/2008 | Smith | |
| 2008/0301791 A1 | 12/2008 | Smith et al. | |
| 2009/0037992 A1* | 2/2009 | Smith | G06F 21/34 |
| | | | 726/6 |
| 2011/0029436 A1* | 2/2011 | Norvell | G06F 21/31 |
| | | | 705/67 |
| 2011/0321146 A1* | 12/2011 | Vernon | G06F 21/35 |
| | | | 726/7 |
| 2016/0127374 A1 | 5/2016 | O'Connell et al. | |
| 2018/0091391 A1 | 3/2018 | Turow et al. | |
| 2019/0104409 A1 | 4/2019 | Wu et al. | |
| 2019/0245684 A1 | 8/2019 | Shen et al. | |
| 2020/0293684 A1 | 9/2020 | Harris et al. | |
| 2022/0368686 A1* | 11/2022 | Bhala | H04L 9/008 |

OTHER PUBLICATIONS

Biswas et al, SMS Based Information Retrieval System for Low End Mobile Devices, May 18, 2013, IEEE, pp. 1-6. (Year: 2013).*

Park et al., "Efficient Multicast Packet Authentication Using Signature Amortization", IEEE, May 15, 2002, pp. 1-14.

Karame et al., "On the Security of End-to-End Measurements Based on Packet-Pair Dispersions", IEEE, Oct. 26, 2012, pp. 149-162.

Kongsgard et al., "Policy-based Labelling: A Flexible Framework for Trusted Data Labelling," IEEE, May 19, 2015, 1-10.

* cited by examiner

600

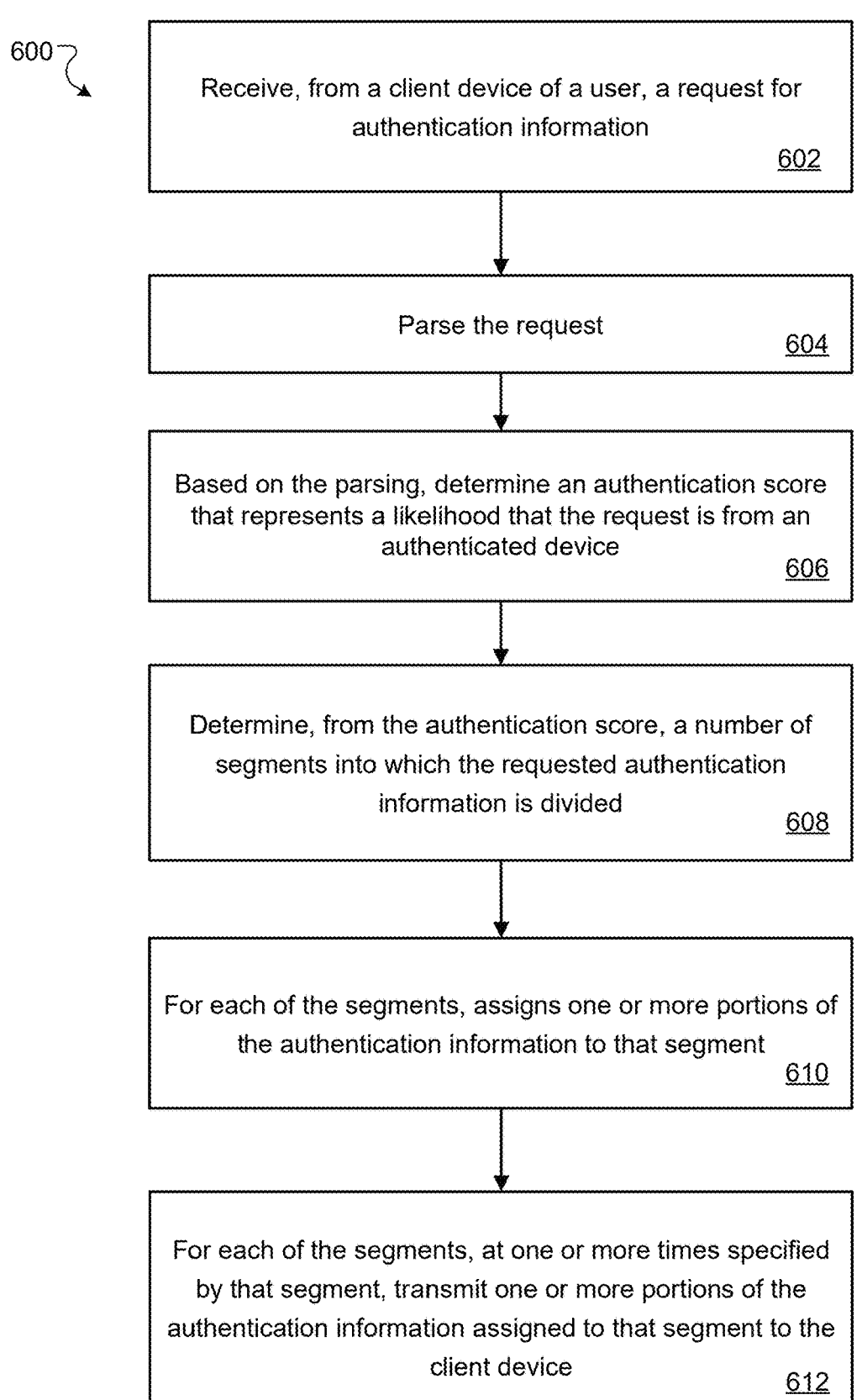

Receive, from a client device of a user, a request for authentication information

602

Parse the request

604

Based on the parsing, determine an authentication score that represents a likelihood that the request is from an authenticated device

606

Determine, from the authentication score, a number of segments into which the requested authentication information is divided

608

For each of the segments, assigns one or more portions of the authentication information to that segment

610

For each of the segments, at one or more times specified by that segment, transmit one or more portions of the authentication information assigned to that segment to the client device

SYSTEMS AND METHODS FOR SECURE DATA TRANSFER

CROSS-REFERENCE TO RELATED APPLICATIONS

This application is a continuation application of and claims priority under 35 U.S.C. § 120 to U.S. application Ser. No. 18/363,523, filed on Aug. 1, 2023, which is a continuation application of and claims priority under 35 U.S.C. § 120 to U.S. application Ser. No. 17/329,380, filed on May 25, 2021, now U.S. Pat. No. 11,765,166, the entire contents of each of which are incorporated herein by reference.

BACKGROUND

Data interception attacks allow unauthorized individuals to gain access to confidential or private information of authorized users. Many interception attacks can be conducted against data in transit. Attackers may steal a user's confidential information through data interception and perform illegal actions such as improperly acquiring services, goods, and money using the stolen confidential information. Interception attacks can be very difficult to detect and thus can lead to severe damage to the users' finances, security, and reputation as well as waste of time and resources for fighting identity theft.

SUMMARY

In general, one innovative aspect of the subject matter described in this specification can be embodied in a computer-implemented method for secure data transfer. The method includes receiving a request, from a client device of a user, for authentication information. The request includes user specified information and additional information that is automatically included in the request by an application running on the client device. The method includes parsing the request; based on the parsing, determining an authentication score that represents a likelihood that the request is from an authenticated device; determining, from the authentication score, a number of segments into which the requested authentication information is divided; and for each of the segments, assigning one or more portions of the authentication information to that segment, wherein each segment is associated with one or more times at which to transmit information assigned to that segment, and at one or more times specified by that segment, transmitting one or more portions of the authentication information assigned to that segment to the client device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The user specified information may include at least one of an email address, a phone number, a full name or a user name. The authentication information may include at least one of a username or a password. The additional information may include information that uniquely identifies the client device. The information that uniquely identifies the client device may include a Media Access Control (MAC) address. The additional information may include information specifying a location of the client device. The method may further include determining a plurality of communication channels that are available to communicate with the user, and based on the determined plurality of communication channels, transmitting one or more portions of the authentication information assigned to each segment to the client device via a different communication channel in the plurality of communication channels. The plurality of communication channels may include two or more of the following: an email, a short message service (SMS) text message, a multimedia message service (MMS) message, a telephone call, a Voice-over-IP (VOIP) communication, a social media platform notification system, a mobile phone push notification, and other mobile device notification systems.

The subject matter described in this specification can be implemented in particular embodiments so as to realize one or more of the following advantages.

The techniques described in this specification allow a data processing system to prevent illicit interception of data in transit by segmenting the data before transferring the data, thus improving the security functioning of the system. The complexity of segmenting data is adjusted based on a determined authentication score that represents a likelihood that a request for the data is from an authenticated device. The system is configured to divide the requested data into a number of packets according to the number of segments determined based on the authentication score. These packets are then transferred to the device at different times and optionally, via different communication channels. Thus, the described techniques make it difficult for a hacker to intercept the requested data, because any possible interception is only a partial interception of the requested data, and in order to obtain all of the requested data, the hacker must intercept all of the packets that are sent at different times (and intercept all different communication channels if the packets are sent via the different communication channels). Accordingly, systems that implement the described techniques can improve their security functioning in comparison to existing systems that transfer data in a single packet.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of an example process for secure data transfer.

Like reference numbers and designations in the various drawings indicate like elements.

DETAILED DESCRIPTION

This specification describes systems and methods for securely transferring data to a user device to prevent illicit interception of the data during the transfer.

Data interception attacks allow unauthorized individuals to gain access to confidential or private information (e.g., authentication information used to access a user account) of authorized users. Many interception attacks can be conducted against data in transit, i.e., data that is traveling from one location to another location across a communication network. Attackers may steal a user's confidential information through data interception and perform illegal actions such as improperly acquiring services, goods, and money using the stolen confidential information. Interception attacks can be very difficult to detect and thus can lead to severe damage to the users' finances, security, and reputation as well as waste of time and resources for fighting identity theft.

The techniques described in this specification allow a data processing system to prevent illicit interception of data in transit by segmenting the data before transferring the data, thus improving the security functioning of the system. The complexity of segmenting data is adjusted based on a determined authentication score that represents a likelihood that a request for the data is from an authenticated device. The system is configured to divide the requested data into a number of packets according to the number of segments determined based on the authentication score. These packets are then transferred to the device at different times and optionally, via different communication channels. Thus, the described techniques makes it difficult for a hacker to intercept the requested data, because any possible interception is only a partial interception of the requested data, and in order to obtain all of the requested data, the hacker must intercept all of the packets that are sent at different times (and intercept all of the different communication channels if the packets are sent via different channels). Accordingly, systems that implement the described techniques can improve their security functions in comparison to existing systems that transfer data in a single packet.

Figure 1:
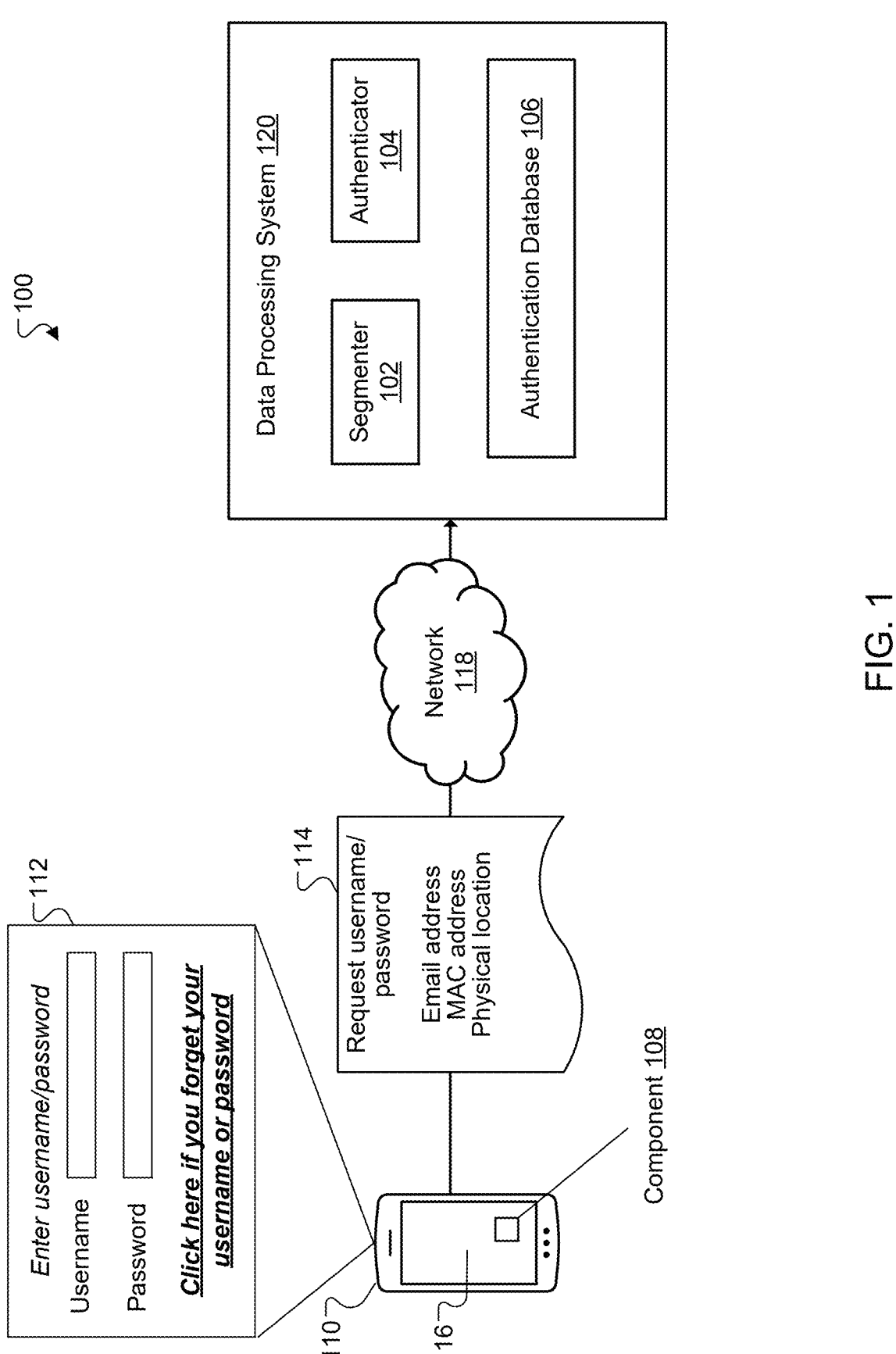
FIG. 1 shows an example of a computing environment including a data processing system for secure data transfer.

FIG. 1 shows an example of a computing environment including a data processing system for secure data transfer.

The computing environment 100 includes a data processing system 120 and a user device (also referred to as "a client device") 110. The data processing system 120 is an example of a server system implemented as computer programs on one or more computers in one or more locations, in which the systems, components, and techniques described below can be implemented.

The data processing system 120 includes a segmenter 102, an authenticator 104, and an authentication database 106. Each of the segmenter 102 and authenticator 104 is an engine that is implemented as one or more software modules or components, installed on one or more computers in one or more locations. In some cases, one or more computers will be dedicated to a particular engine; in other cases, multiple engines can be installed and running on the same computer or computers.

The data processing system 120 is associated with an organization (e.g., a financial institution, a company, an educational institution, a non-profit organization, or a government agency) that manages a plurality of user accounts, which can be accessed via a mobile/web application. When a user registers a user account with the system 120, the authentication database 106 automatically stores the information used to register the user account. For example, the database 106 can store one or more of a first name and last name of the user, a registered email address of the user, a registered location (or address) of the user, or a registered phone number of the user. The authentication database 106 can also store information associated with the registered user device(s) such as a unique identifier of the device, a type of the device, or a maker of the device, and/or any other information provided by the user during the registration. For example, the authentication database 106 can store one or more Media Access Control (MAC) addresses associated with one or more devices that the user frequently uses, respectively.

The user device 110 can communicate with the data processing system 120 via a communication network 118 to request data such as authentication information. The user device 110 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. The communication network 118 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

As shown in the example of FIG. 1, the user device 110 is a mobile phone of a user who is trying to access, via a mobile/web application (hereafter referred to as "the application" for simplicity), a user account managed by the organization associated with the data processing system 120. To access the user account, the user needs to fill out a form (e.g., form 112) with their authentication information such as a username and a password. The form 112 is displayed by the application on a user interface 116 of the user device 110. The username can be, for example, (i) a sequence of one or more letters and/or one or more numbers and/or one or more other special characters, (ii) a phone number, or (iii) an email address.

However, if the user forgets the authentication information required to access the user account, the user can trigger the user device 110 to send a request for the authentication information to the data processing system 120. For example, the user can trigger the user device 110 to send a request 114 by clicking on the "Click here if you forget your username or password" option on the form 112 provided by the application.

The request includes user specified information provided by the user. The user specified information includes at least one of an email address, a phone number, a full name, or a username. The request further includes additional information that is automatically included in the request by a part (e.g., by component 108) of the mobile/web application running on the user device 110. The additional information includes information that uniquely identifies the user device 110 and/or information specifying a location of the user device 110. Information specifying a location of the user device 110 can include one or more of the following: a country name, a state name, a county name, a city name, a street name, a block number, or a building name.

Information that uniquely identifies the client device can be, for example, a Media Access Control (MAC) address associated with the user device 110. Generally, a MAC address is a hardware address uniquely associated with a network interface card (NIC) of a computing device. The NIC is a computer circuit card that enable the computing device to connect to a communication network (e.g., the Internet). A MAC address is also referred to as a networking hardware address, a burned-in address (BIA), or a physical address. A MAC address generally includes a string of multiple sets of two-digits and/or characters, separated by colons. Examples of a MAC address that includes 6 sets of two-digits and/or characters are as follows:

00:0b: 1c: 2d: 3d: 4e;
00:0b: 1c: 2d: 55:66;
00:11:22:33:44:55.

MAC addresses do not change, as opposed to an Internet Protocol (IP) address, which is dynamic and can change from time to time. Therefore, automatically including the MAC address in the request provides a more reliable way for the data processing system 120 to authenticate the device from which the request is sent (in comparison to authenticating devices based on IP addresses).

The user device 110 is configured to send the request 114 to the data processing system 120 via the communication network 118. The data processing system 120 is configured to receive the request and parse the request. When parsing the request, the system 120 identifies a type of the request (e.g., identifying what type of authentication information the user is requesting), breaks down the information included in the request into multiple pieces of information (e.g., email address, MAC address, physical location) and uses them as inputs to invoke the components in the system 120 (e.g., invoking the segmenter 102 and authenticator 104) to perform operations to complete the request.

Based on the parsing of the request 114, the system 120 determines, by using the authenticator 104, an authentication score that represents a likelihood that the request is from an authenticated device. In particular, the authenticator 104 is configured to compare the information included in the request with the registered information associated with the user and the user device(s) and previously stored in the authentication database 106 to determine the authentication score. The authentication score is a score within a predetermined score range. For example, the authentication score can be an integer number between 0-100 with 0 being the lowest level of authentication and 100 being the highest level of authentication. As another example, the authentication score can be an integer or a fractional number between 0 and 1 with 0 being the lowest level of authentication and 100 being the highest level of authentication.

The authentication 104 can determine the authentication score for the request 114 by using different methods in which each method is associated with a respective level of authentication. For example, a method that uses a MAC address to authenticate the request 114 is associated with the highest level of authentication (e.g., authentication scores are in the score range of 70-100), a method that uses an email verification code is associated with a medium level of authentication (e.g., authentication scores are in the score range of 40-70), and a method that uses a physical address included in the request 114 is associated with the lowest level of authentication (e.g., authentication scores are in the score range of 0-39).

Figure 2:
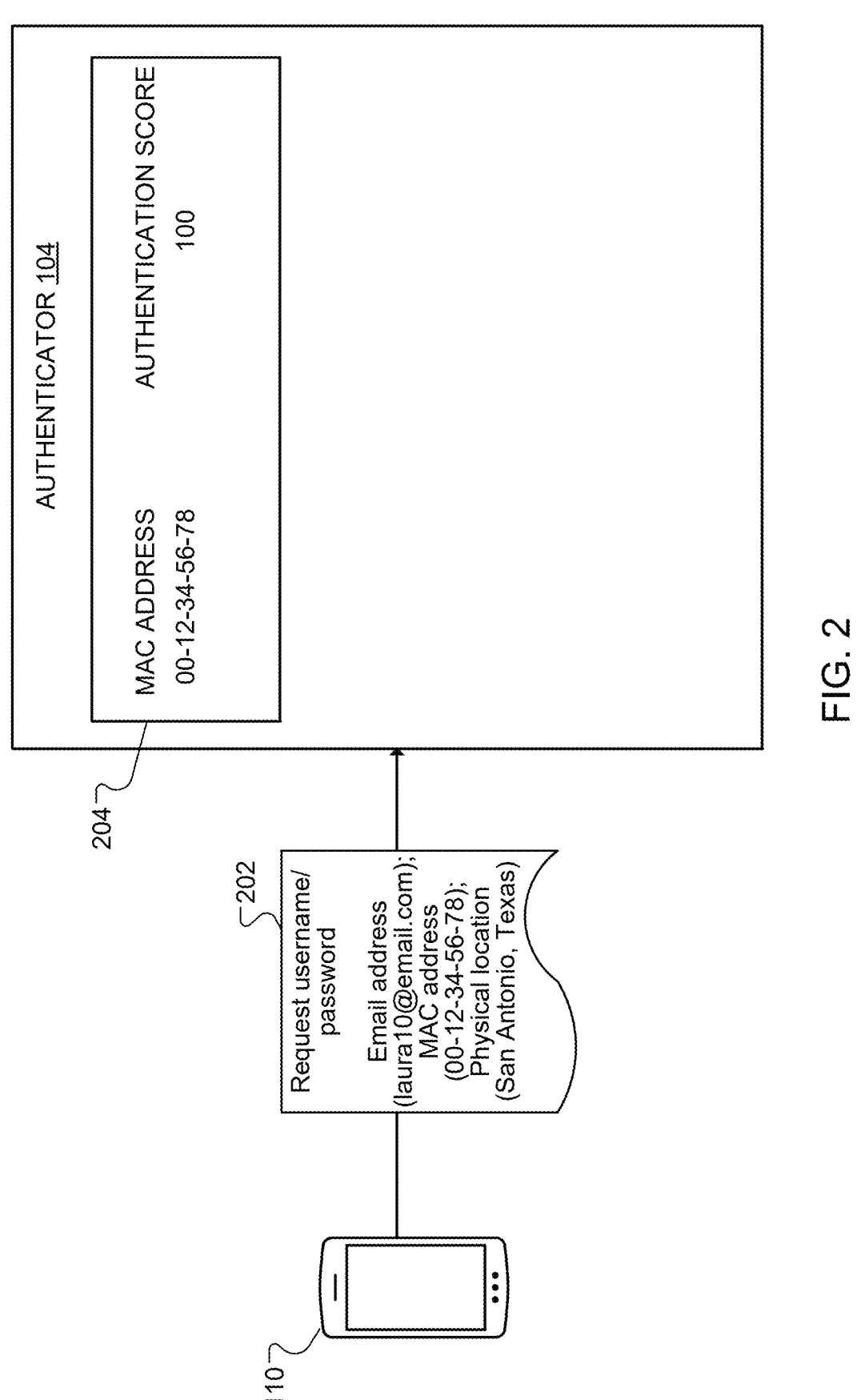
FIG. 2 illustrates an example of determining an authentication score.
Figure 3:
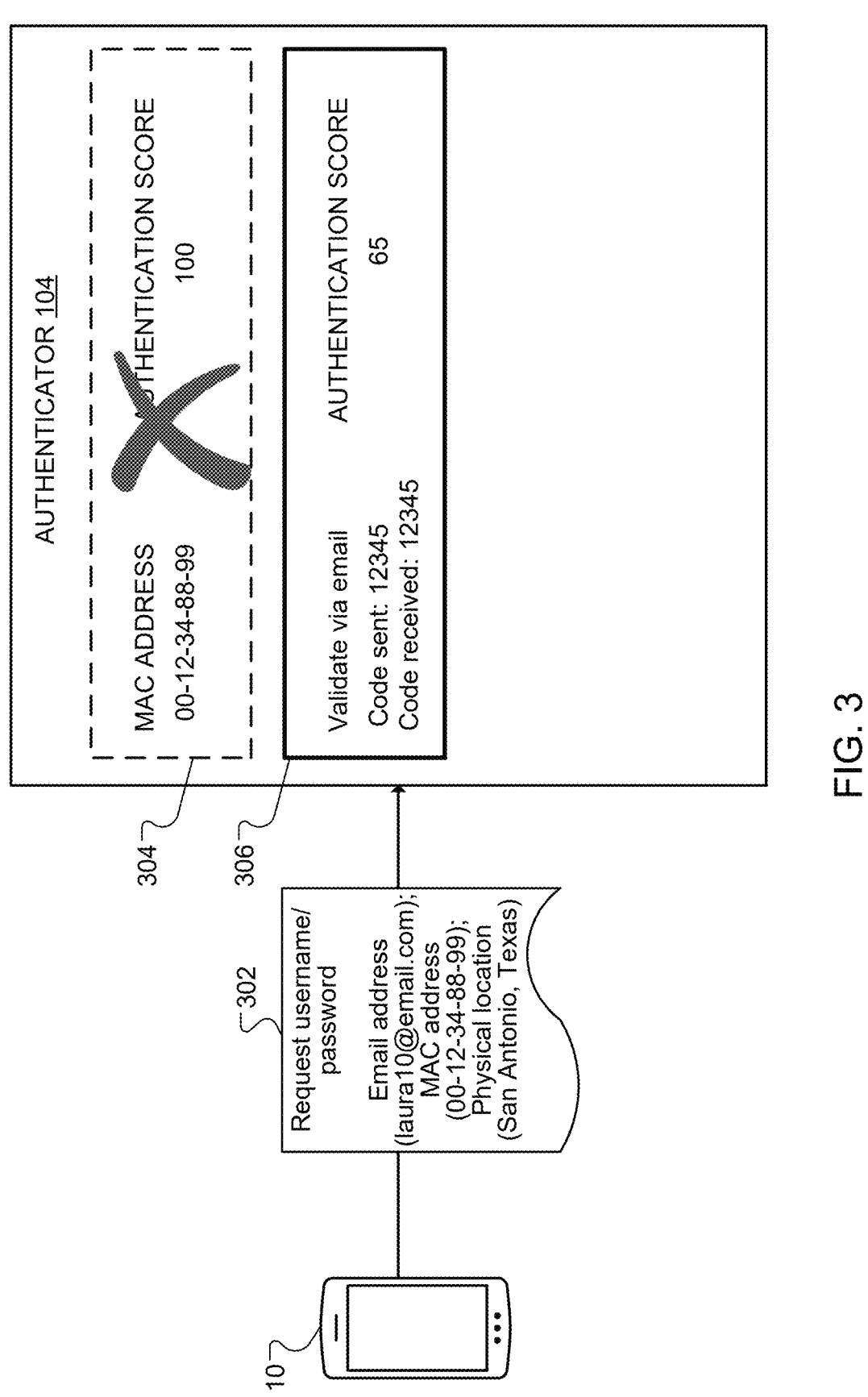
FIG. 3 shows another example of determining an authentication score.
Figure 4:
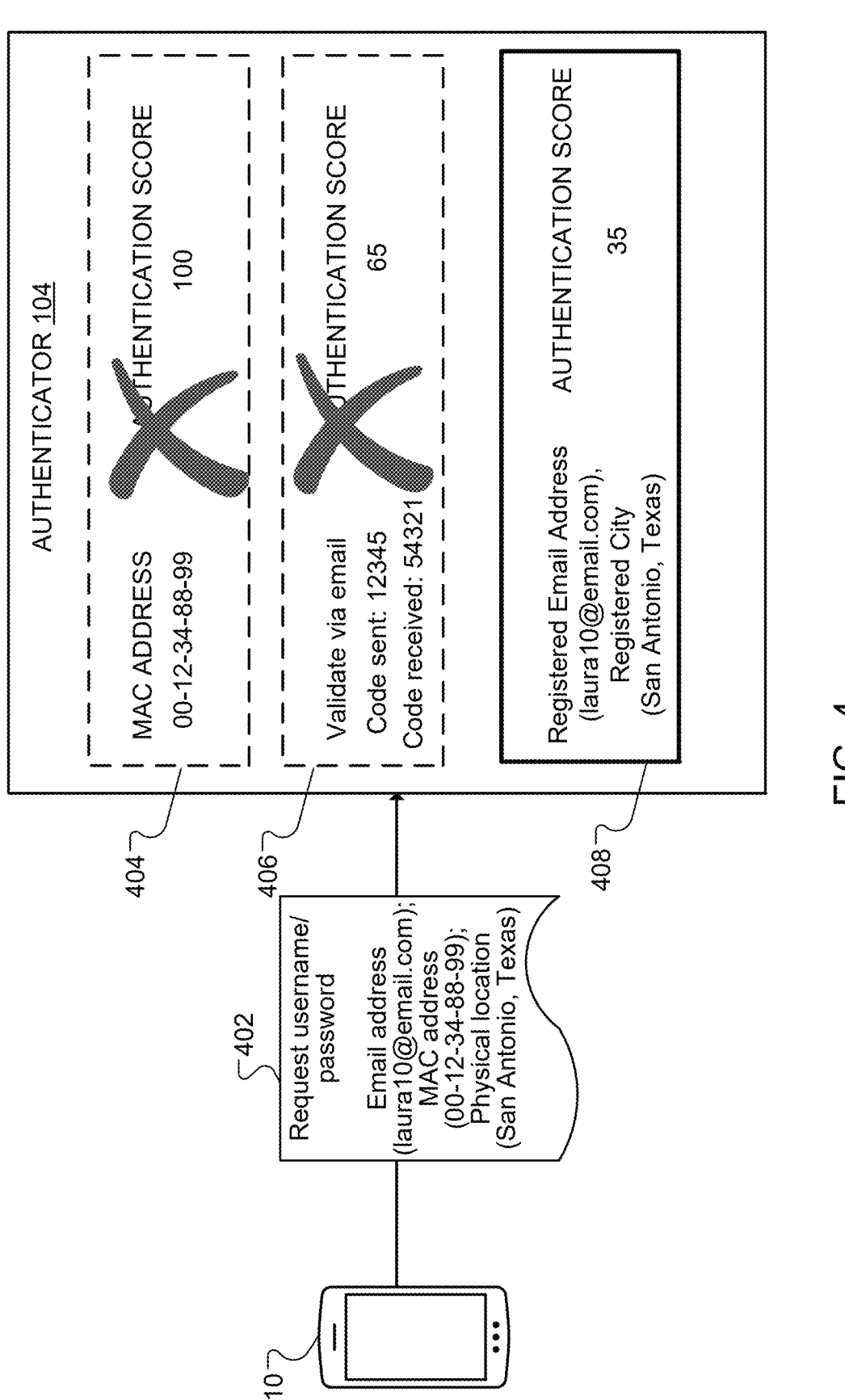
FIG. 4 illustrates another example of determining an authentication score.

FIG. 2, FIG. 3 and FIG. 4 illustrate examples of how the authenticator 104 determines an authentication score. For illustrative purposes, authentication scores in these examples are integers in the score range of 0-100 with 0 being the lowest level of authentication and 100 being the highest level of authentication.

In the example of FIG. 2, the user device 110 sends a request 202 for a password (and/or a username) to the data processing system 120 (not shown). The request 202 includes an email address (e.g., laura10@email.com), a MAC address (e.g., 00-12-34-56-78) and a physical location of the user device 110 (e.g., San Antonio, Texas). The authenticator 104 identifies a user account associated with the email address included in the request 202. The authenticator 104 then compares the MAC address included in the request 202 with the MAC address of a registered user device associated with the identified user account. The MAC address of the registered user device was previously stored in the authentication database 106. In this case, the MAC address (e.g., 00-12-34-56-78) included in the request 202 matches with the MAC address stored in the authentication database 106. Therefore, the authenticator 104 determines that the request 202 has a high level authentication. FIG. 2 shows a mapping 204, in which the authenticator 104 maps the request 202 that includes the registered MAC address (e.g., 00-12-34-56-78) to an authentication score of 100. This authentication score confirms that the request 202 is from an authenticated device.

In the example of FIG. 3, the user device 110 sends a request 302 for a password (and/or a username) to the data processing system 120 (not shown). The request 302 includes an email address (e.g., laura10@email.com), a MAC address (e.g., 00-12-34-88-99) and a physical location of the user device 110 (e.g., San Antonio, Texas). The authenticator 104 identifies a user account associated with the email address included in the request 302. The authenticator 104 then compares the MAC address (e.g., 00-12-34-88-99) included in the request 302 with the MAC address (e.g., 00-12-34-56-78) of a registered user device associated with the identified user account. The MAC address of the registered user device was previously stored in the authentication database 106. In this case, the MAC address (e.g., 00-12-34-88-99) included in the request 302 does not matches with the MAC address (e.g., 00-12-34-56-78) stored in the authentication database 106. Therefore, the authenticator 104 cannot map the request 302 to an authentication score using the MAC address included in the request 302 (i.e., the mapping 304 cannot be derived). Thus, the authenticator 104 uses another authentication method to determine whether the request 302 comes from an authenticated device. The authenticator 104 sends an email with a code (e.g., 12345) to the registered email address of the user account (e.g., laura 10@email.com) or to an alternative email address associated with the user account, and displays, on the user interface 116, a request that the user provides the code to the mobile/web application. In this example, the user checks the email, gets a code, and enters the code (e.g., 12345) to the mobile/web application. The authenticator 104 receives the code and determines whether the code is the one that was included in the email sent to the registered email address. Because the code that the user entered matches with the code that the authenticator 104 sent to the registered email address, the authenticator 104 determines that the request 302 has a medium level authentication and maps the request 302 to an authentication score of 65, as shown in a mapping 306.

In the example of FIG. 4, the user device 110 sends a request 402 for a password (and/or a username) to the data processing system 120 (not shown). The request 402 includes an email address (e.g., laura10@email.com), a MAC address (e.g., 00-12-34-88-99) and a physical location of the user device 110 (e.g., San Antonio, Texas). The authenticator 104 identifies a user account associated with the email address included in the request 402. The authenticator 104 then compares the MAC address (e.g., 00-12-34-88-99) included in the request 402 with the MAC address (e.g., 00-12-34-56-78) of a registered user device associated with the identified user account. The MAC address of the registered user device was previously stored in the authentication database 106. In this case, the MAC address (e.g., 00-12-34-88-99) included in the request 402 does not matches with the MAC address (e.g., 00-12-34-56-78) stored in the authentication database 106. Therefore, the authenticator 104 cannot map the request 402 to an authentication score using the MAC address included in the request 402 (i.e., a mapping 404 cannot be derived). Thus, the authenticator 104 uses a second authentication method to determine whether the request 402 comes from an authenticated device. The authenticator 104 sends an email with a code (e.g., 12345) to the registered email address of the user account (e.g., laura10@email.com) or to an alternative email address associated with the user account, and displays, on the user interface 116, a request that the user provides the code to the mobile/web application. In this case, the user checks the email, gets a code and enters the code (e.g., 54321) to the mobile/web application. The authenticator 104 receives the code and determines whether the received code is the one that was included in the email sent to the registered email address. Because the code that the user entered (e.g., 54321) does not match with the code that the authenticator 104 sent to the registered email address (e.g., 12345), the authenticator 104 determines that the second authentication method does not work (i.e., the mapping 406 between the user request 402 and an authentication score cannot be derived based on the email verification method). In case the authenticator 104 does not receive any code from user device 110, the authenticator 104 also determines that the second authentication method does not work. In these cases, the authenticator 104 uses a third authentication method to authenticate the request 402. In particular, the authenticator 104 determines whether the physical location of the user device 110 which is included in the request 402 matches with a registered location (or a registered address) associated with the identified user account. In this example, the physical location included in the request 110 (e.g., San Antonio, Texas) matches with the registered location associated with the identified user account. Therefore, the authenticator 104 determines that the request 402 has a low level authentication and maps the request 402 to an authentication score of 35 as shown in a mapping 408.

Referring back to FIG. 1, after the authentication score for the request 114 is determined, the system 120 determines, using the segmenter 102, from the authentication score, a number of segments into which the requested authentication information is divided. Generally, if a request has a higher level of authentication, then less segments are needed, and if a request has a lower level of authentication, then more segments are needed to improve security. In other words, the number of segments is inversely proportional to the authentication score determined for a request.

Table 1 shows an example of a relationship between an authentication score and a number of segments, and how the requested information is divided into multiple packets according to the number of segments. In this example, the requested information is a password (e.g., Mountain View123!).

TABLE 1

| Example of authentication scores and data segmentations | | |
|---|---|---|
| Authentication score | Number of Segments | Example password packets (Full password: MountainView123!) |
| 70-100 (100 being the highest) | 2 | Packet 1: Mounta Packet 2: inView123! |
| 40-69 | 4 | Packet 1: Mou Packet 2: nta Packet 3: inView1 Packet 4: 23! |
| 0-39 | 6 | Packet 1: Mo Packet 2: un Packet 3: ta Packet 4: inV Packet 5: iew1 Packet 6: 23! |

As shown in Table 1, when a request has a high level of authentication (e.g., when the authentication score determined for the request is in the score range of 70-100), the segmenter 102 determines that only a small number of segments (e.g., 2) is needed. When a request has a medium level of authentication (e.g., when the authentication score determined for the request is in the score range of 40-69), the segmenter 102 determines that more segments are needed (e.g., the number of segments is 4) to improve security. When a request has a low level of authentication (e.g., when the authentication score determined for the request is in the score range of 0-39), the segmenter 102 determines that even more segments are needed (e.g., the number of segments is 6) to improve security and to prevent any illicit interception of the requested authentication information. The segmenter 102 divides the requested information into multiple packets according to the determined number of segments. The number of packets is equal to the number of segments. Each packet includes one or more portions of the authentication information that the segmenter 102 assigns to the corresponding segment. For example, as shown in Table 1 and in FIG. 5, when the authentication score is in the score range of 70-100 and the number of segments (or packets) is determined as 2, the segmenter 102 assigns one portion of the password (e.g., Mounta) to packet 1 (502) and the remaining portion of the password (e.g., in View123!) to packet 2 (504).

Each segment is associated with one or more times at which to transmit information assigned to that segment to the user device 110. At one or more times specified by that segment, the system 102 transmits one or more portions of the authentication information assigned to that segment to the user device 110. For example, as shown in FIG. 5, the system 120 transmits packet 1 (502) which includes "Mounta" to the user device 110 at time $T_1$ and transmits packet 2 (504) which includes "in View123!" to the user device 110 at time $T_2$.

As another example, the segmenter 102 may assign two portions of the password (e.g., "Mo" and "unta") to packet 1 and two other portions of the password (e.g., "in" and "View123!) to packet 2. Assuming that packet 1 is associated with times $T_1$ and $T_2$, and packet 2 is associated with times $T_3$ and $T_4$, the segmenter 102 may transmit the first portion of packet 1 which includes "Mo" to the user device 110 at time $T_1$, transmit the second portion of packet 1 which includes "unta" to the user device 110 at time T$_2$, transmit the first portion of packet 2 which includes "in" to the user device 110 at time T$_3$, and transmit the second portion of packet 2 which includes "View123!" to the user device 110 at time T$_4$.

In some implementations, to further enhance security, the system 120 determines a plurality of communication channels that are available to communicate with the user. Based on the determined plurality of communication channels, the system transmits one or more portions of the authentication information assigned to each segment to the client device via a different communication channel in the plurality of communication channels. The plurality of communication channels includes two or more of the following: an email, a short message service (SMS) text message, a multimedia message service (MMS) message, a telephone call, a Voice-over-IP (VOIP) communication, a social media platform notification system, a mobile phone push notification, and other mobile device notification systems.

Figure 5:
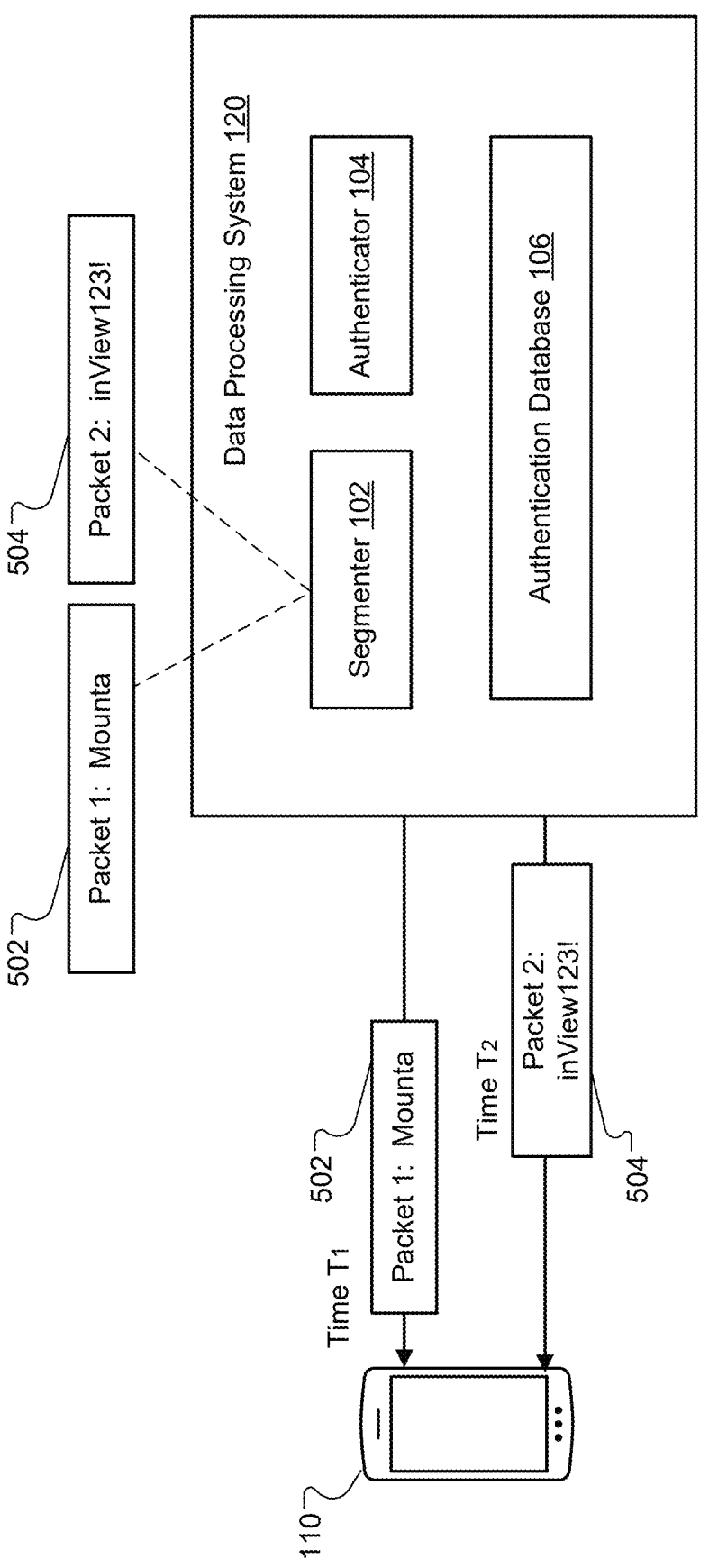
FIG. 5 shows an example of segmenting and transferring data based on an authentication score.

For example, referring to FIG. 5, the system 120 may send the portion of the authentication information included in packet 1 to the user device 110 via email, and send the portion of the authentication information included in packet 2 to the user device 110 via a text message.

The described techniques makes it difficult for a hacker to intercept the requested data, because any possible interception is only a partial interception of the requested data, and in order to obtain all of the requested data, the hacker must intercept all of the packets that are sent at different times (and intercept all different communication channels if the packets are sent via the different communication channels).

FIG. 6 is a flow diagram of an example process for secure data transfer. For convenience, the process 600 will be described as being performed by a system of one or more computers located in one or more locations. For example, a data processing system, e.g., the data processing system 120 of FIG. 1, appropriately programmed in accordance with this specification, can perform the process 600.

The system receives, from a client device of a user, a request for authentication information (step 602). In some implementations, the authentication information includes at least one of a username or a password.

In some implementations, the request includes user specified information and additional information that is automatically included in the request by an application running on the client device. The user specified information may include at least one of an email address, a phone number, a full name or a user name. In some implementations, the additional information includes information that uniquely identifies the client device and/or information specifying a location of the client device. Information specifying a location of the user device 110 can include one or more of the following: a country name, a state name, a county name, a city name, a street name, a block number, or a building name. Information that uniquely identifies the client device can be, for example, a Media Access Control (MAC) address associated with the client device.

The system parses the request (step 604). In particular, the system identifies a type of the request (e.g., identifying what type of authentication information the user is requesting), breaks down the information included in the request into multiple pieces of information (e.g., email address, MAC address, physical location) and uses them as inputs to invoke the components in the system (e.g., invoking a segmenter and an authenticator) to perform operations to complete the request.

Based on the parsing, the system determines an authentication score that represents a likelihood that the request is from an authenticated device (step 606). In particular, the system compares the information included in the request with the registered information associated with the user and the user device(s) and previously stored in an authentication database of the system to determine the authentication score. Examples of determining an authentication score are described in more details above with reference to FIG. 2, FIG. 3 and FIG. 4.

The system determines, from the authentication score, a number of segments into which the requested authentication information is divided (step 608). Generally, if a request has a higher level of authentication, then less segments are needed, and if a request has a lower level of authentication, then more segments are needed to improve security. In other words, the number of segments is inversely proportional to the authentication score determined for a request. Table 1 above shows an example of a relationship between an authentication score and a number of segments.

For each of the segments, the system assigns one or more portions of the authentication information to that segment (step 610). Each segment is associated with one or more times at which to transmit information assigned to that segment.

For each of the segments, at one or more times specified by that segment, the system transmits one or more portions of the authentication information assigned to that segment to the client device (step 612).

In some implementations, to further enhance security, the system determines a plurality of communication channels that are available to communicate with the user. Based on the determined plurality of communication channels, the system transmits one or more portions of the authentication information assigned to each segment to the client device via a different communication channel in the plurality of communication channels. The plurality of communication channels includes two or more of the following: an email, a short message service (SMS) text message, a multimedia message service (MMS) message, a telephone call, a Voice-over-IP (VOIP) communication, a social media platform notification system, a mobile phone push notification, and other mobile device notification systems.

Figure 7:
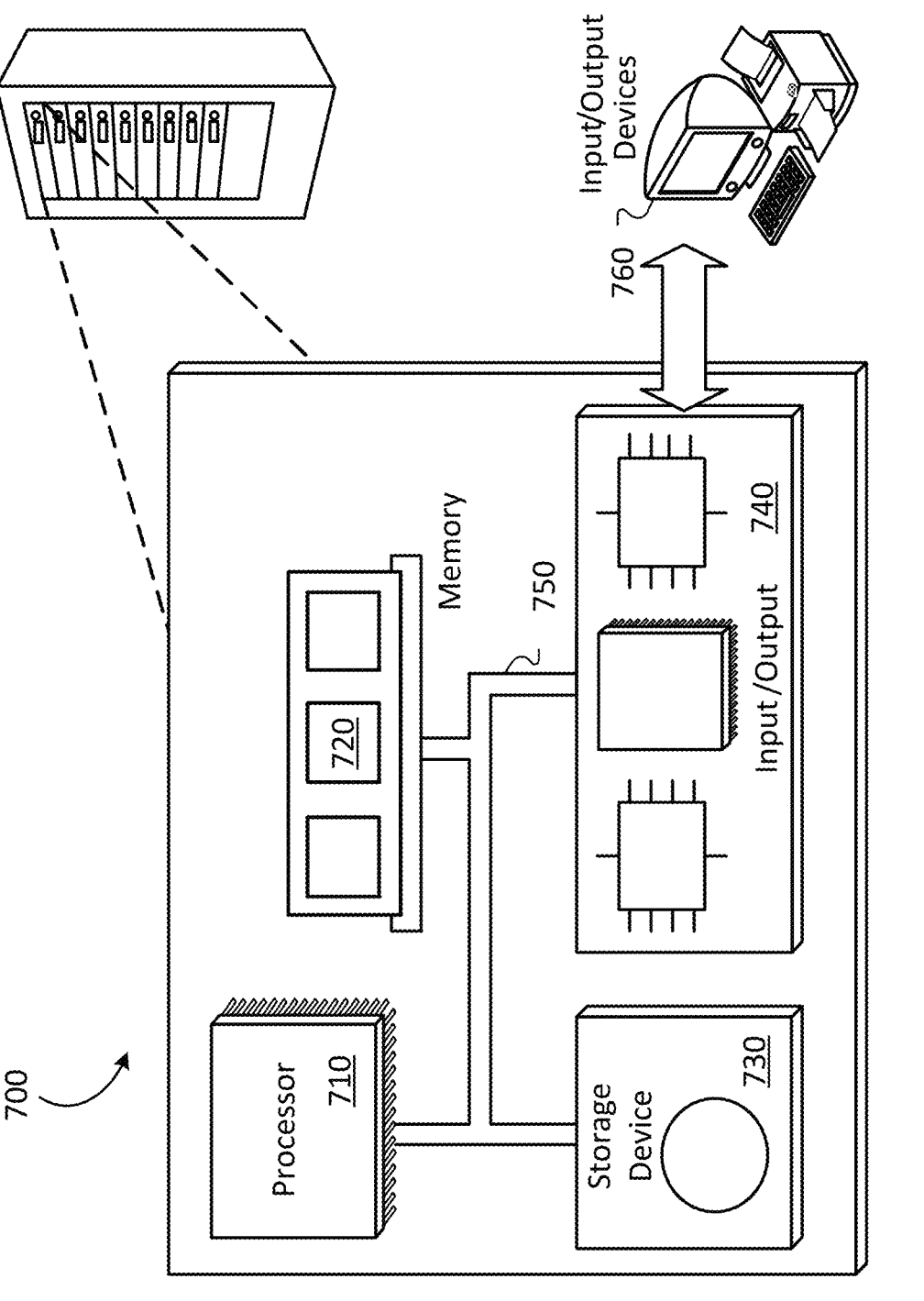
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. The system 700 may include one or more processors 710, a memory 720, one or more storage devices 730, and one or more input/output (I/O) devices 760 controllable through one or more I/O interfaces 740. The various components 710, 720, 730, 740, or 760 may be interconnected through at least one system bus 750, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 760. The I/O device(s) 760 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 760 may also include one or more output devices such as a display, LED(s), an audio output device (e.g., a speaker), a printer, a haptic output device, and so forth. The I/O device(s) 760 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 760. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers. The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, from a client device of a user, a request for information;
   parsing the request;
   based on the parsing, determining an authentication score of the client device;
   based on the authentication score, determining, a number of portions into which the requested information is divided;

dividing the requested information into the number of portions; and
   transmitting two or more portions of the number of portions of the requested information to the client device at two or more times.

2. The method of claim 1, wherein the request for information comprises at least one of an email address, a phone number, a full name or a user name.

3. The method of claim 1, wherein the requested information comprises at least one of a username or a password.

4. The method of claim 1, wherein the request for information comprises device information that uniquely identifies the client device.

5. The method of claim 4, wherein the device information that uniquely identifies the client device comprises a Media Access Control (MAC) address.

6. The method of claim 1, wherein the request for information comprises device information specifying a location of the client device.

7. The method of claim 1, further comprising:
   determining a plurality of communication channels that are available to communicate with the user, and
   based on the determined plurality of communication channels, transmitting one or more portions of the number of portions of the requested information to the client device via one or more communication channels in the plurality of communication channels.

8. The method of claim 7, wherein the plurality of communication channels comprises two or more of the following: an email, a short message service (SMS) text message, a multimedia message service (MMS) message, a telephone call, a Voice-over-IP (VOIP) communication, a social media platform notification system, a mobile phone push notification, and other mobile device notification systems.

9. The method of claim 1, wherein the authentication score represents a likelihood that the request is from an authenticated device.

10. The method of claim 9, wherein dividing the requested information into the number of portions comprises: for each of the portions, assigning one or more pieces of the requested information to that portion.

11. A system comprising:
   one or more processors; and
   one or more non-transitory computer-readable storage media coupled to the one or more processors and having instructions stored thereon which, when executed by the one or more processors, cause the one or more processors to perform operations comprising:
   receiving, from a client device of a user, a request for information;
   parsing the request;
   based on the parsing, determining an authentication score of the client device;
   based on the authentication score, determining, a number of portions into which the requested information is divided;
   dividing the requested information into the number of portions; and
   transmitting two or more portions of the number of portions of the requested information to the client device at two or more times.

12. The system of claim 11, wherein the request for information comprises at least one of an email address, a phone number, or a user name.

13. The system of claim 11, wherein the requested information comprises at least one of a username or a password.

14. The system of claim 11, wherein the request for information comprises: (i) device information that uniquely identifies the client device, or (ii) information specifying a location of the client device.

15. The system of claim 14, wherein the device information that uniquely identifies the client device comprises a Media Access Control (MAC) address.

16. The system of claim 11, wherein the operations further comprise:

determining a plurality of communication channels that are available to communicate with the user, and based on the determined plurality of communication channels, transmitting one or more portions of the information assigned to each segment to the client device via a different communication channel in the plurality of communication channels.

17. The system of claim 16, wherein the plurality of communication channels comprise two or more of the following: an email, a short message service (SMS) text message, a multimedia message service (MMS) message, a telephone call, a Voice-over-IP (VOIP) communication, a social media platform notification system, a mobile phone push notification, and other mobile device notification systems.

18. One or more non-transitory computer-readable storage media coupled to one or more processors and having instructions stored thereon which, when executed by the one or more processors, cause the one or more processors to perform operations comprising:

receiving, from a client device of a user, a request for information;

parsing the request;

based on the parsing, determining an authentication score of the client device;

based on the authentication score, determining, a number of portions into which the requested information is divided;

dividing the requested information into the number of portions; and transmitting two or more portions of the number of portions of the requested information to the client device at two or more times.

19. The one or more non-transitory computer-readable storage media of claim 18, wherein the request for information comprises: (i) information that uniquely identifies the client device, or (ii) information specifying a location of the client device.

20. The one or more non-transitory computer-readable storage media of claim 18, wherein the operations further comprise:

determining a plurality of communication channels that are available to communicate with the user, and based on the determined plurality of communication channels, transmitting one or more portions of the information to the client device via a different communication channel in the plurality of communication channels.

21. The method of claim 1, wherein the information uniquely identifying the client device includes a Media Access Control address associated with the client device.

* * * * *